United States Patent [19]

Betz

[11] Patent Number: 4,616,330

[45] Date of Patent: Oct. 7, 1986

[54] PIPELINED MULTIPLY-ACCUMULATE UNIT

[75] Inventor: B. Keith Betz, Edina, Minn.

[73] Assignee: Honeywell Inc., Minneapolis, Minn.

[21] Appl. No.: 526,562

[22] Filed: Aug. 25, 1983

[51] Int. Cl.[4] .............................................. G06F 7/52
[52] U.S. Cl. ...................................... 364/728; 364/758
[58] Field of Search ................ 364/728, 736, 758, 716

[56] References Cited

U.S. PATENT DOCUMENTS

| | | | |
|---|---|---|---|
| 3,515,344 | 6/1970 | Goldschmidt et al. ............. | 364/758 |
| 3,699,534 | 10/1972 | Kavtz ................................. | 364/900 |
| 3,815,095 | 6/1974 | Wester ................................ | 364/200 |
| 3,900,724 | 8/1975 | McIver et al. ...................... | 364/758 |
| 4,314,349 | 2/1982 | Batcher .............................. | 364/716 |
| 4,490,805 | 12/1984 | Tamura .............................. | 364/728 |

Primary Examiner—David H. Malzahn
Attorney, Agent, or Firm—Stephen W. Buckingham

[57] ABSTRACT

The present invention uses a plurality of basic cells to perform a multiply-accumulate operation. Each basic cell is essentially equivalent to a one bit full adder and two flip-flops. These basic cells are connected in such a way that the processing is said to be pipelined.

5 Claims, 19 Drawing Figures

PIPELINED MULTIPLY-ACCUMULATE UNIT

The present invention relates to systems for performing high speed computer arithmetic and more particularly systems for performing multiplication or multiplication accumulation operations.

BACKGROUND OF THE INVENTION

A common operation arising in the field of electronic data processing is the operation known as multiply-accumulate. This operation is particularly common in areas involving signal processing and other fields where correlations of functions must be evaluated. A multiply-accumulate operation typically involves a series of pairs of numbers. The product of the two numbers composing each pair is formed and all of the products thus formed are summed.

One example of a multiply-accumulate operation is the evaluation of the inner product of two vectors. If X and Y are vectors in a space having T orthogonal dimensions, the inner product Z, is defined to be $$Z = \sum_{i=0}^{T-1} X_i Y_i \quad (1)$$

where $X_i$ is the ith component of X and $Y_i$ is the ith component of Y.

On a general purpose digital computer multiply-accumulate operations are typically performed by producing each product and summing the results. If a large number of products are required to be performed, the time consumed in such an operation may be considerable, due to the inherently slow nature of computer multiplication.

SUMMARY OF THE INVENTION

The present invention uses a plurality of basic cells to perform a multiply-accumulate operation. Each basic cell is essentially equivalent to a one bit full adder and two flip-flops. These basic cells are connected in such a way that the processing is said to be pipelined. In a pipelined system a first set of basic data serves as data input to a set of basic cells. The members of the set of basic cells than perform their specific functions in processing the data and pass the output to other cells. The system is then ready to accept another set of data. In this way the system is able to begin processing the second set of data values before all processing of the first set of data values has been completed. Subsequently in the processing a new data set may be transmitted to the system during each clock cycle. Therefore, if N clock cycles are required to process one data set and M data sets are to be processed, only N×M cycles of the system clock are required.

DETAILED DESCRIPTION OF THE PREFERRED EMBODIMENT

The present invention performs a multiply-accumulate function as described by equation (1) above. In order to simplify the discussion below the assumption will be made that the products of corresponding elements of two series of numbers are to be summed. The symbol X will be used to denote the entire first series of numbers and the symbol Y the second series of numbers. The symbols $X_i$ and $Y_i$ will be used to denote the ith number in the X and Y series, respectively. The symbols $X_i^j$ and $Y_i^j$ will be used to denote the j order bit of the ith component of the X and Y series, respectively. Alternatively j may be called the bit weight or binary weight of the bit. The concept of a bit weight may be best understood by recalling that a binary number is, in effect, the sum of a series of zeroes and ones multiplied by two raised to various preselected powers. In each case the zero or one is the value of the bit itself and the bit weight is the power to which two is raised.

Figure 1:
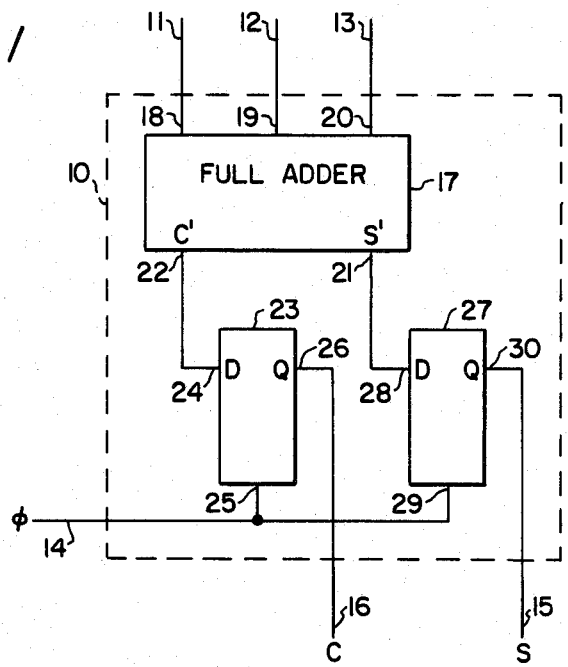
FIG. 1 is a block diagram of the functional equivalent of the basic cell of the invention.

FIG. 1 is a drawing of the functional equivalent of the basic cell of a preferred embodiment of the present invention. Dashed box 10 encloses the elements of the basic cell. The basic cell has bit inputs 11, 12, and 13, clock input 14, and outputs 15 and 16. Bit inputs 11, 12, and 13 are electrically connected to inputs 18, 19, and 20 of one bit full adder 17. Full adder 17 has outputs 21 and 22 identified as S' and C'. Output 21 corresponds to the sum output of a one bit full adder and output 22 corresponds to the carry output of a one bit full adder. Output 22 of full adder 17 is electrically connected to D input 24 of D-type flip-flop 23. Output 21 of full adder 17 is electrically connected to D input 28 of D-type flip-flop 27. Clock input 14 of the basic cell is electrically connected to clock inputs 25 and 29 of D-type flip-flops 23 and 27, respectively. Outputs 26 and 30 of D-type flip-flops 23 and 27 are electrically connected to outputs 16 and 15 of the basic cell, respectively. In operation, the basic cell receives 3 one bit input signals on lines 11, 12, and 13. These are coupled to input regions 18, 19, and 20 of full adder 17. Full adder 17 produces two output signals S' and C' of weights N and N+1, respectively. Those signals are coupled to inputs 28 and 24 of flip-flops 27 and 23 respectively. The clock signal on line 14 is timed so that it will be applied to inputs 25 and 29 of flip-flops 23 and 27 respectively after signals S' and C' have had sufficient time to settle to appropriate values based on the input supplied to inputs 11, 12, and 13. When the clock signal is applied to input 14 of basic cell 10 flip-flops 23 and 27 will latch, thereby providing output signals S and C on lines 15 and 16. Output signals S and C will be equal to signals S' and C' at the time that the clock pulse is applied, but will be maintained at that same value after the signals applied to inputs 11, 12, and 13 are removed.

Figure 2:
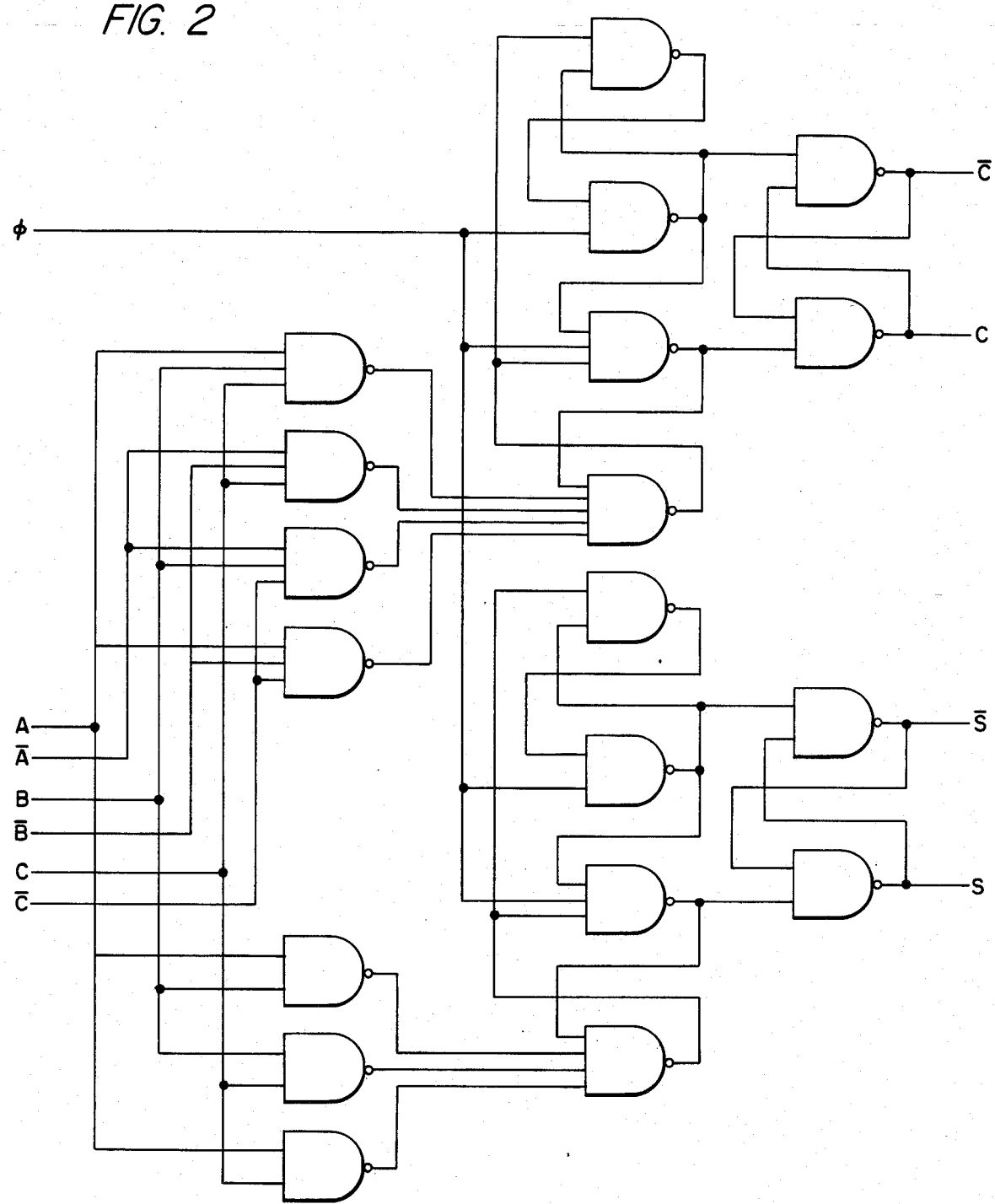
FIG. 2 is a block diagram of a circuit which may be used as a basic cell of the invention.

FIG. 2 is a block diagram of a circuit which will provide the desired basic cell function. The circuit of FIG. 2 includes 11 two input NAND logic gates, 6 three input NAND logic gates, 1 four input NAND logic gate, and 1 five input NAND logic gate.

In alternative embodiments, other numbers of inputs and outputs may be provided. If only two input regions of a cell are to be used, a simpler cell may be constructed having two input regions and two output regions. Functionally the cell would still be equivalent to an adder with a flip-flop connected to each adder output, however. In other alternatives cells may be provided with more than three input regions. If a cell has more than three input regions, moe than two output regions will be required. In any embodiment, each input region and each output region is assigned a device bit weight. The logic in the cell will be such that arithmetic value of all input signals, taking into account the assigned device bit weights, will be equal to the arithmetic value of the output signal, taking into account the device bit weights. In the preferred embodiment, all input regions have a device bit weight of zero, and the output regions have device bit weights in a range from zero to q-1 where q is equal to the number of output regions. Other values for these device bit weights may be used, however. In any embodiment, the output regions will receive signals from a clocked flip-flop as described above in the example of the cell having three inputs and two outputs.

The invention will be described with regard to a system for producing the sum of the products of a series of pairs of three bit binary numbers. In an actual implementation of the invention, it is likely that numbers containing more than three bits would be used. A probable number bits in the input signals to an actual implementation would be sixteen. Three bit numbers are chosen, however, in order to simplify the explanation. The system described may be easily extended for use with numbers containing more than three bits, or to systems for processing pairs of numbers having unequal numbers of bits.

The proper operation of the present invention requires that the logical AND of each bit of the first number with each bit of the second number be calculated. The results of the logical AND process are designated $P_j^{jk}$, and are defined by $$P_j^{jk} = X_i^j Y_i^k \tag{2}$$

Figure 3:
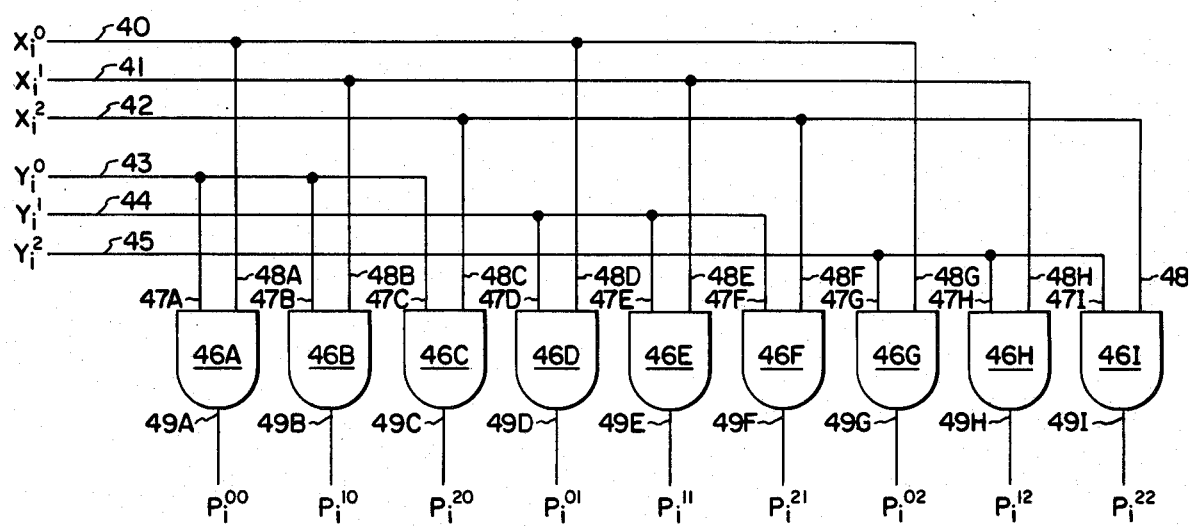
FIG. 3 is a block diagram of a signal conditioning circuit to be used with the invention.

FIG. 3 is a block diagram of a circuit to produce the appropriate values of $P_j^{jk}$. Signal lines 40, 41, and 42 carry signals representative of the values of the bits of order 0, 1, and 2, respectively, of the number $X_i$. Likewise lines 43, 44, and 45 carry signals representative of the values of the bits of order 0, 1, and 2, respectively, of the number $Y_i$. Inputs 47A and 48A of logical AND gate 46A are electrically connected to signal lines 43 and 40, respectively. The output of logical AND gate 46A, appearing at output region 49A will be equal to the logical AND of $X_i^0$ and $Y_i^0$. Similarly the output of each of the other of logical AND gates 46B through 46I will be equal to the logical AND of other combinations of bits taken from numbers $X_i$ and $Y_i$. For systems accepting input signals having more than three bits more than three bits more logical AND gates would be required. In general, systems accepting one n bit input signal and one l bit input signal will require n×l logical AND gates.

Figure 4:
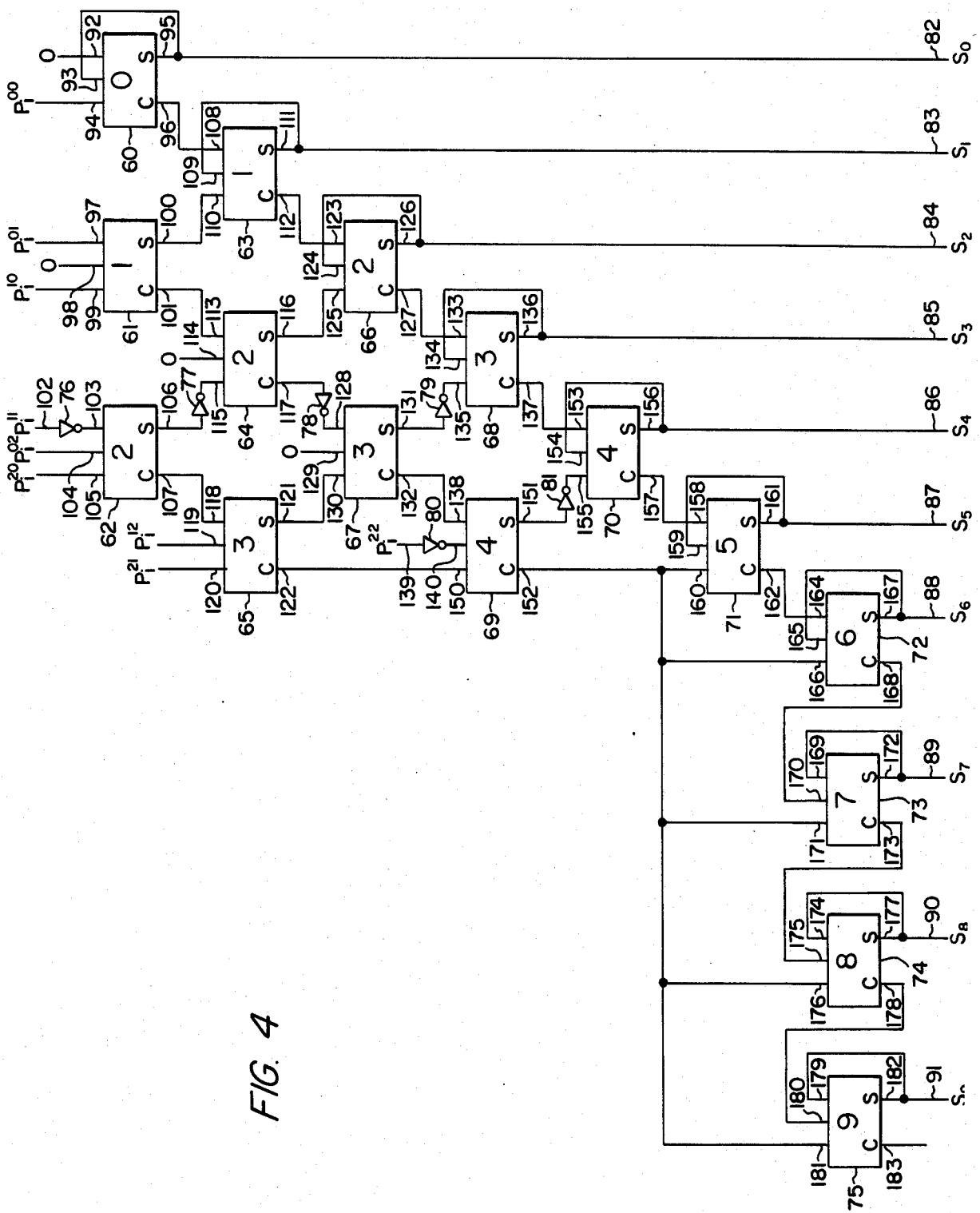
FIG. 4 is a block diagram of the invention configured for use with three bit input signals.

FIG. 4 illustrates an embodiment of the invention adapted to produce the sums of the products of corresponding three bit signed numbers. Negative numbers are represented using the twos complement notation which is commonly used in computer arithmetic.

The circuit of FIG. 4 includes sixteen of the basic cells shown in FIGS. 1 and 2. These sixteen cells are identified by reference numbers 60 through 75 and are electrically connected in the manner shown. The clock inputs to the cells have been omitted to simplify the drawing, but would be present in an actual implementation. Each of the cells has a number such as the zero on cell 60 or the one of cell 61. These numbers represent the bit weight of the particular cell. All input regions are assigned device bit weights of zero. Each S output is assigned a device bit weight of zero and each C output is assigned a device bit weight of one. The S output of each cell will be connected to another cell of equal bit weight, or to the system output line of that particular bit weight. The C output of each cell will be electrically connected to a cell with a bit weight one greater than that of the cell providing the output. In general each input and output region of each cell is assigned an array bit weight equal to the device bit weight of that region plus the bit weight of the cell of which that region is a part. Each output region is then electrically connected either to an input region having an array bit weight equal to the array bit weight of the output region or to the system output line having that bit weight. As long as this requirement is met and the outputs of internal cells do not feed back to input regions of that same cell, cells may be connected in almost any manner and will produce correct results.

The system output is provided on output lines 82 through 91 and is identified by $S_0$ through $S_9$. Each output signal is representative of one bit of the calculated sum, and has a bit weight equal to the subscript number associated therewith.

Basic cells 60, 63, 66, 68, 70, and 71 through 75 may be designated output cells as the sum output signal from each of these forms one bit of the output signal. The sum output region of each output cell is electrically connected to one of the input regions of that same cell in order to provide proper summing and to hold a value stored in the flip-flop associated with the sum output until calculations in other cells are completed. Those skilled in the art will note that a ten bit output signal is provided although a maximum of six bits are required to represent the product of any two three bit numbers. The additional four output bits are provided in order that the process of summing the products will not cause an overflow to occur. In general for n bit input signals 2n+m output bits are provided where n and m are positive integers. In an actual embodiment it is likely that more than four such additional output bits would be provided. Additional cells would be electrically connected to the system in a manner analogous to that in which cells 72 through 75 are connected.

In addition to the basic cells shown, the circuit of FIG. 4 includes inverters 76 through 81. These inverters are required in order to insure that the circuit will properly operate on negative numbers represented in twos complement notation. If the circuit were intended to operate on only positive numbers these inverters and conductor 163 should be omitted.

In order to best explain the operation of the circuit of FIG. 4 an example will be used. For this example the sum of the products of two pairs of numbers will be calculated. The values to be used for this example are shown below.

$$X_1 = 2 = 010_2 \tag{3}$$

$$Y_1 = 3 = 011_2 \tag{4}$$

$$X_2 = -2 = 110_2 \quad (5)$$

$$Y_2 = 2 = 010_2 \quad (6)$$

The value of the negative number, $X_2$, is expressed using standard twos complement notation. From the values given in equations (3) through (6) the logical AND functions may be evaluated. The evaluation of these logical AND functions gives values of one for $P_1{}^{10}$, $P_1{}^{11}$, $P_2{}^{11}$, and $P_2{}^{21}$. The values resulting from evaluation of all of the other logical AND functions are equal to 0.

The discussion of this example will center around FIGS. 5 through 18. FIGS. 5, 7, 9, 11, 13, 15, and 17 show the input values to each of the cells during each of the first seven clock cycles of the example. FIGS. 6, 8, 10, 12, 14, 16, and 18 show the output values from each of the cells during those same clock periods.

Figure 5:
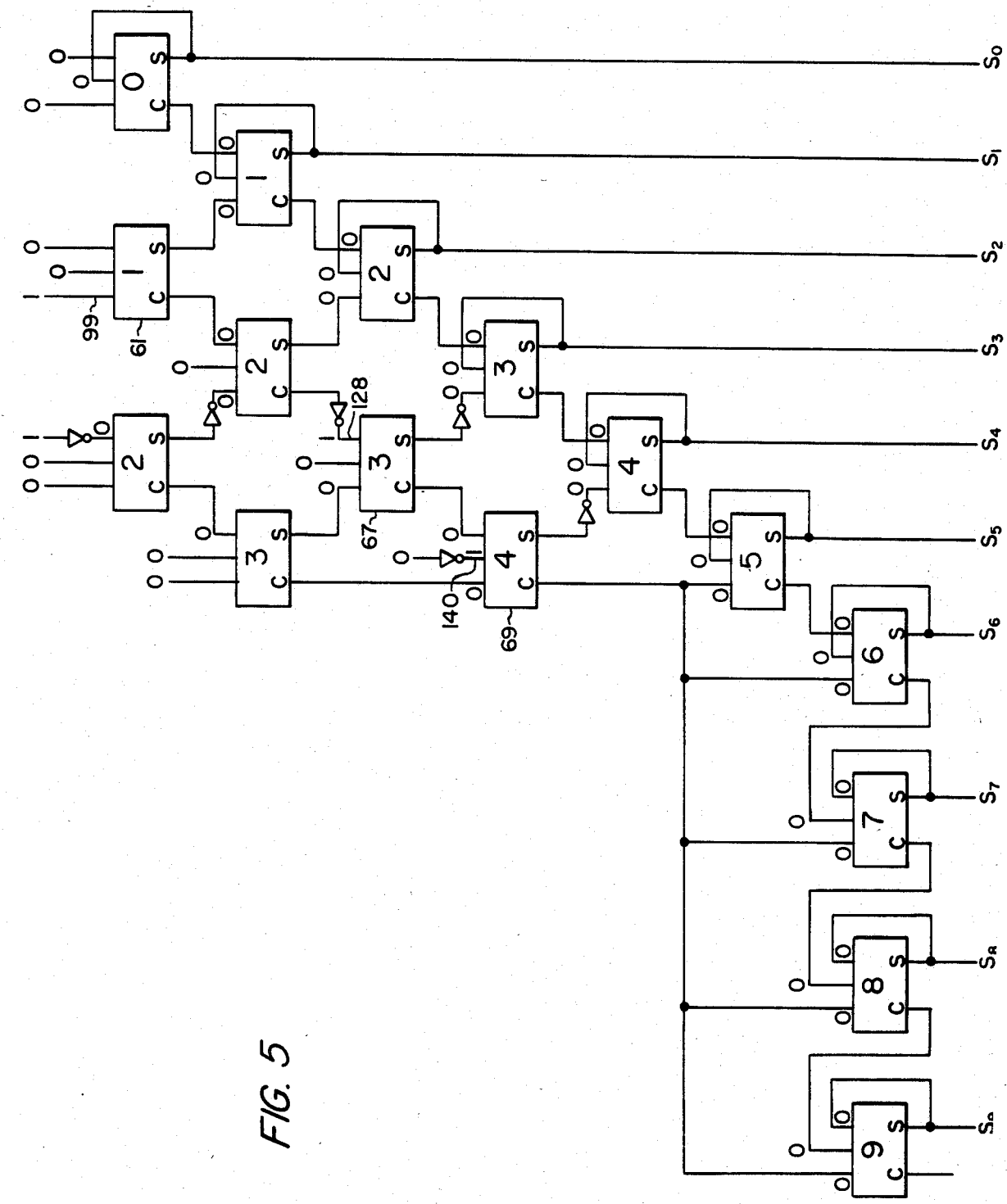
FIGS. 5 through 18 are block diagrams of the invention showing input and output values for the basic cells during an example of the inventions operation.
Figure 6:
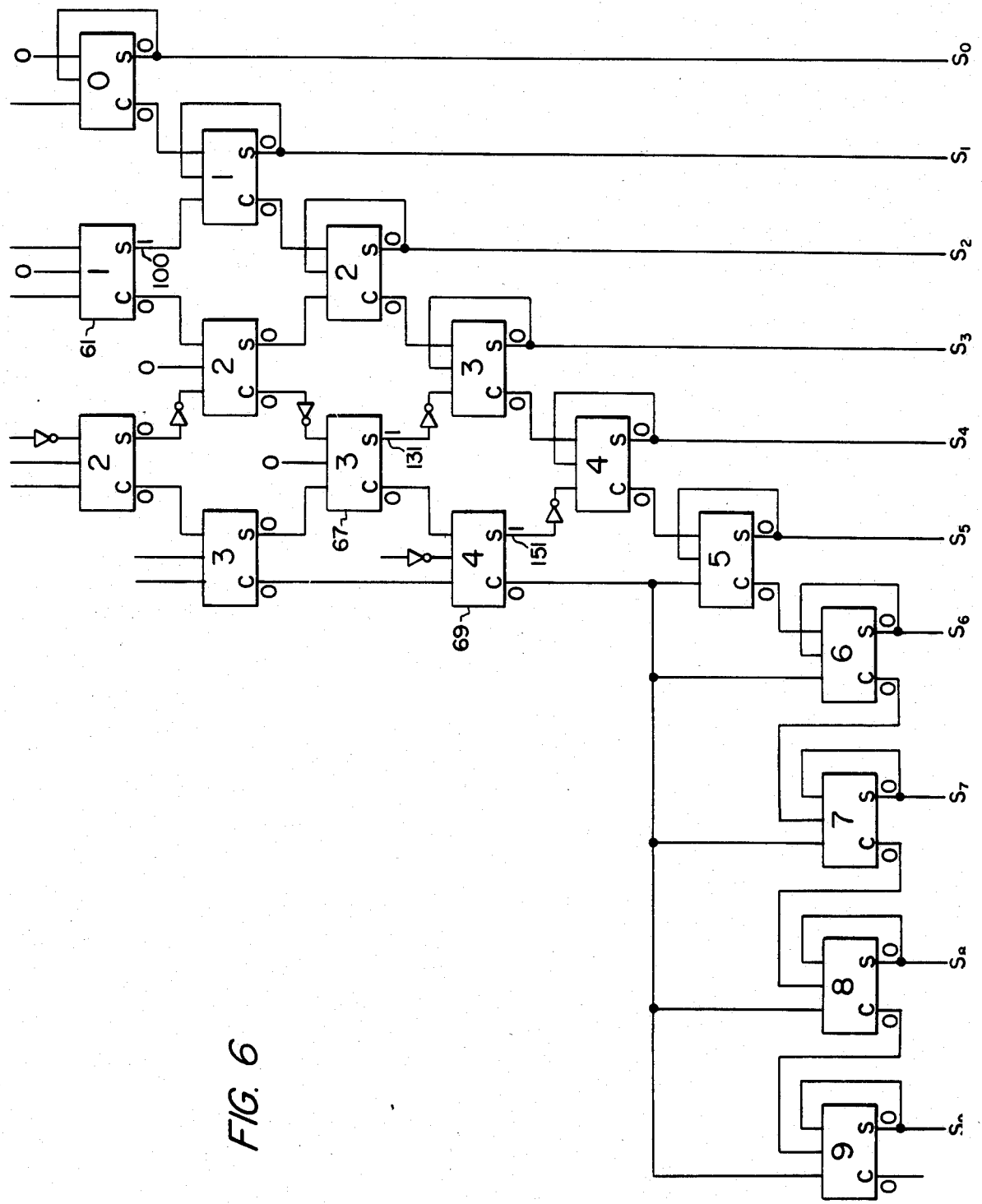

Before calculations begin the system must be initialized by presetting the flip-flop associated with the S outputs of cells 62, 67, and 69 to values of 1, and resetting all other flip-flops to values of 0. When this is done and the appropriate input signals are provided to the input regions of the basic cells, the input values shown in FIG. 5 result. As shown in FIG. 5 the input signals to the input regions of the cells at the beginning of the first clock period are all equal to 0 except for the input signals provided to input region 99 of cell 61 and the input signal provided to input region 140 of cell 69. The input signals provided to those two input regions are equal to 1. The output signals resulting from these input signal values are shown in FIG. 6. All output signals are equal to 0 except for the output signal at output region 100 of cell 61 and the output signal at output region 151 of cell 69, which are equal to one.

Figure 7:
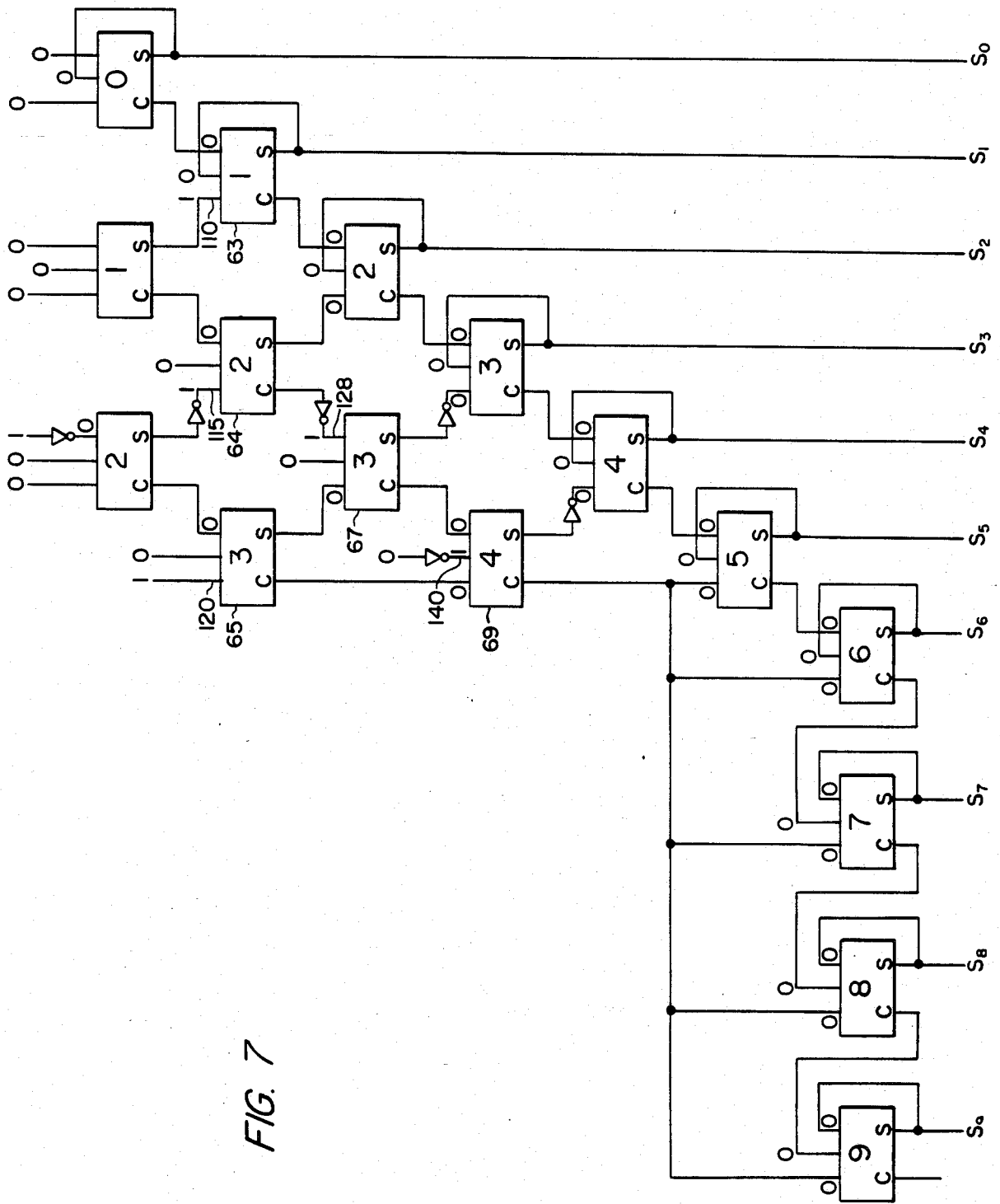

FIG. 7 illustrates the values of the input signals provided to each cell at the beginning of the second clock period. These input values result from the output from the various cells during the first clock period and from the values of $P_2$ shown above. As may be seen from FIG. 7 the input signals provided to input regions 110 of cell 63, 115 of cell 64, 120 of cell 65, 128 of cell 67, and 140 of cell 69 are all equal to 1. The input signals to all other input regions of the basic cells are equal to 0.

Figure 8:
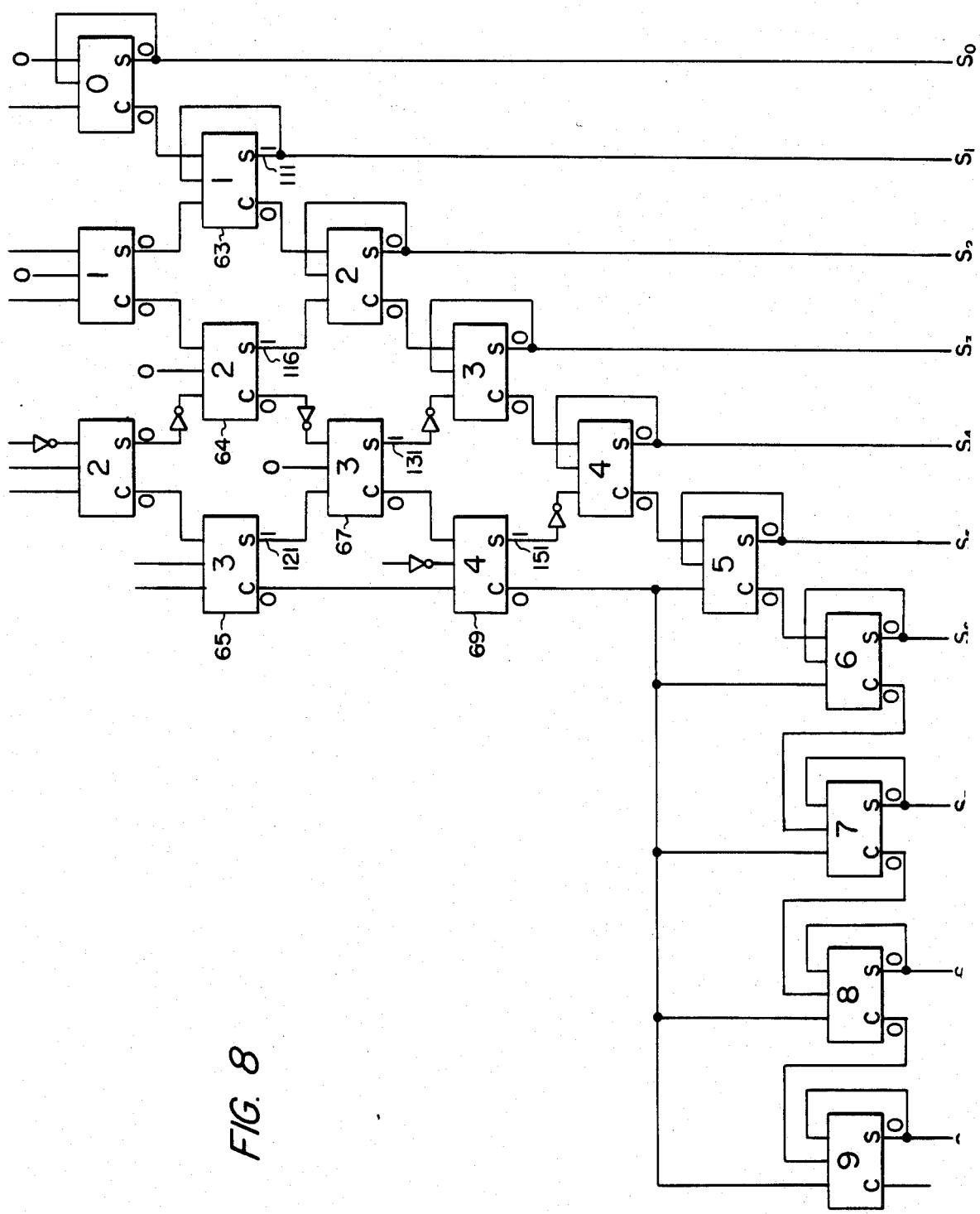

FIG. 8 shows the output signals which result in each output region of the array at the end of the second clock period. As shown in FIG. 8 the output signals at output regions 111 of cell 63, 116 of cell 64, 121 of cell 65, and 151 of cell 69 are equal to 1. All other output signals are equal to 0.

Figure 9:
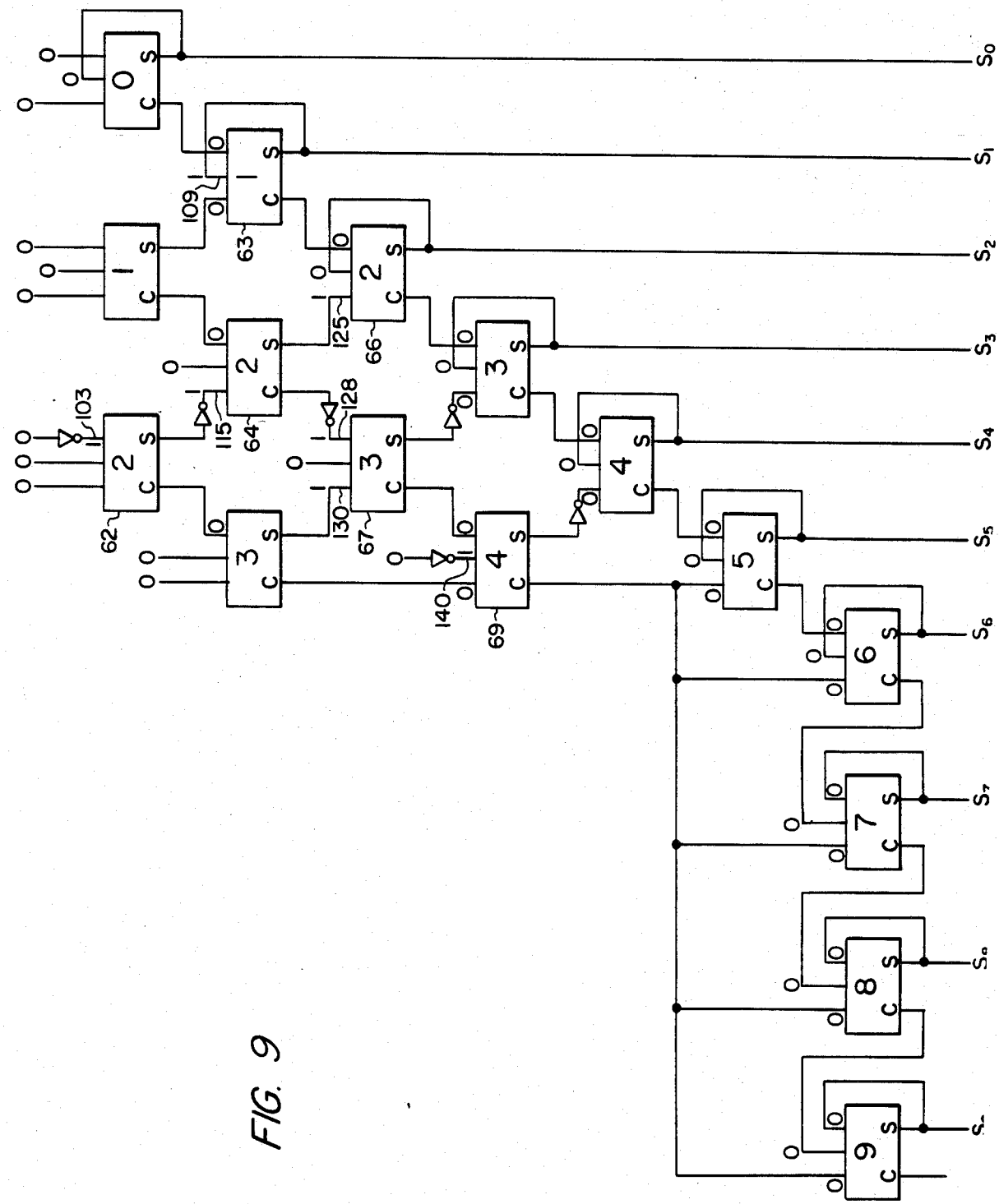

Because the example being described produces the sum of the products of a sequence including only two pairs of numbers all subsequent values of $P_i$ are considered to be equal to 0. Given this fact the input values to each cell at the beginning of the third clock period are as shown in FIG. 9. As may be seen from FIG. 9 the inputs to input regions 103 of cell 62, 109 of cell 63, 115 of cell 64, 125 of cell 66, 128 and 130 of cell 67, and 140 of cell 69 are equal to 1. All other input values are equal to 0.

Figure 10:
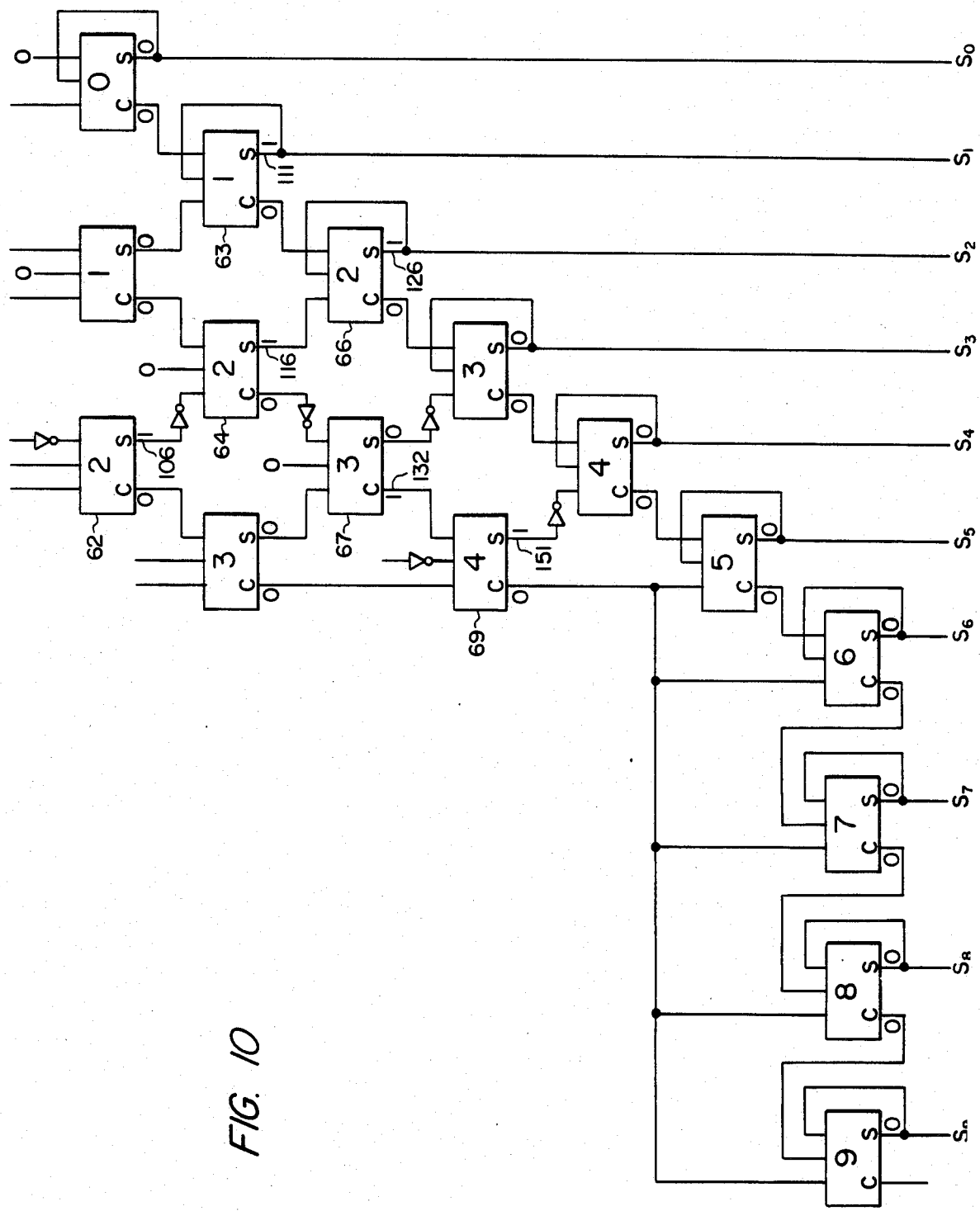

FIG. 10 shows the output values from each of the cells at the end of the third clock period. As may be seen from FIG. 10, output region 106 of cell 62, output region 111 of cell 63, output region 116 of cell 64, output region 126 of cell 66, output region 132 of cell 67, and output region 151 of cell 69 all receive signals indicative of values equal to 1. All other output regions receive signals indicative of values equal to 0.

Figure 11:
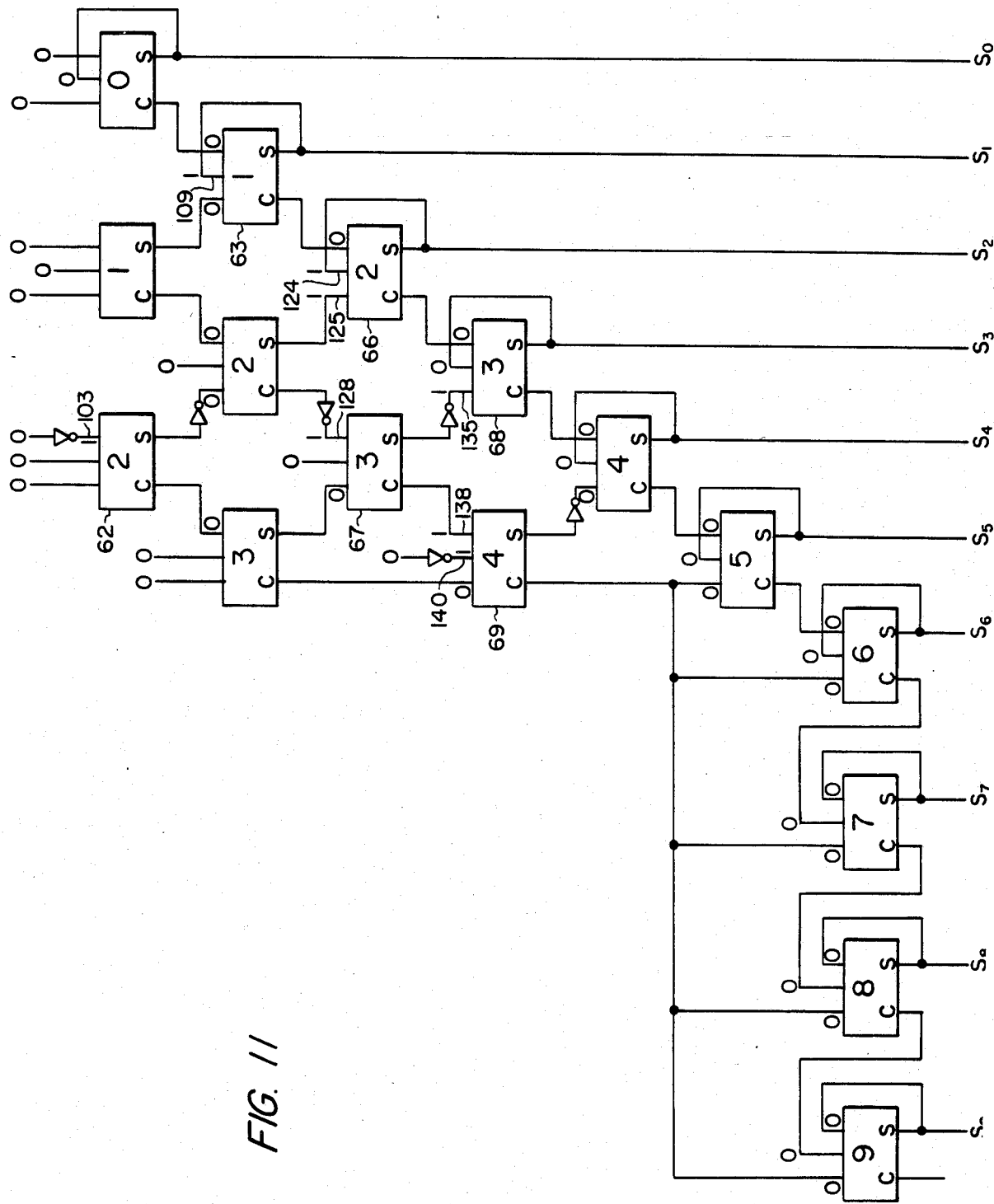

FIG. 11 illustrates the input signals to each of the cells at the beginning of the fourth clock period. As may be seen from FIG. 11 the input signals to input region 103 of cell 62, input region 109 of cell 63, input regions 124 and 125 of cell 66, input region 128 of cell 67, input region 135 of cell 68, and input regions 138 and 140 of cell 69 all receive signals indicative of values equal to 1. All other input regions receive signals indicative of values equal to 0.

Figure 12:
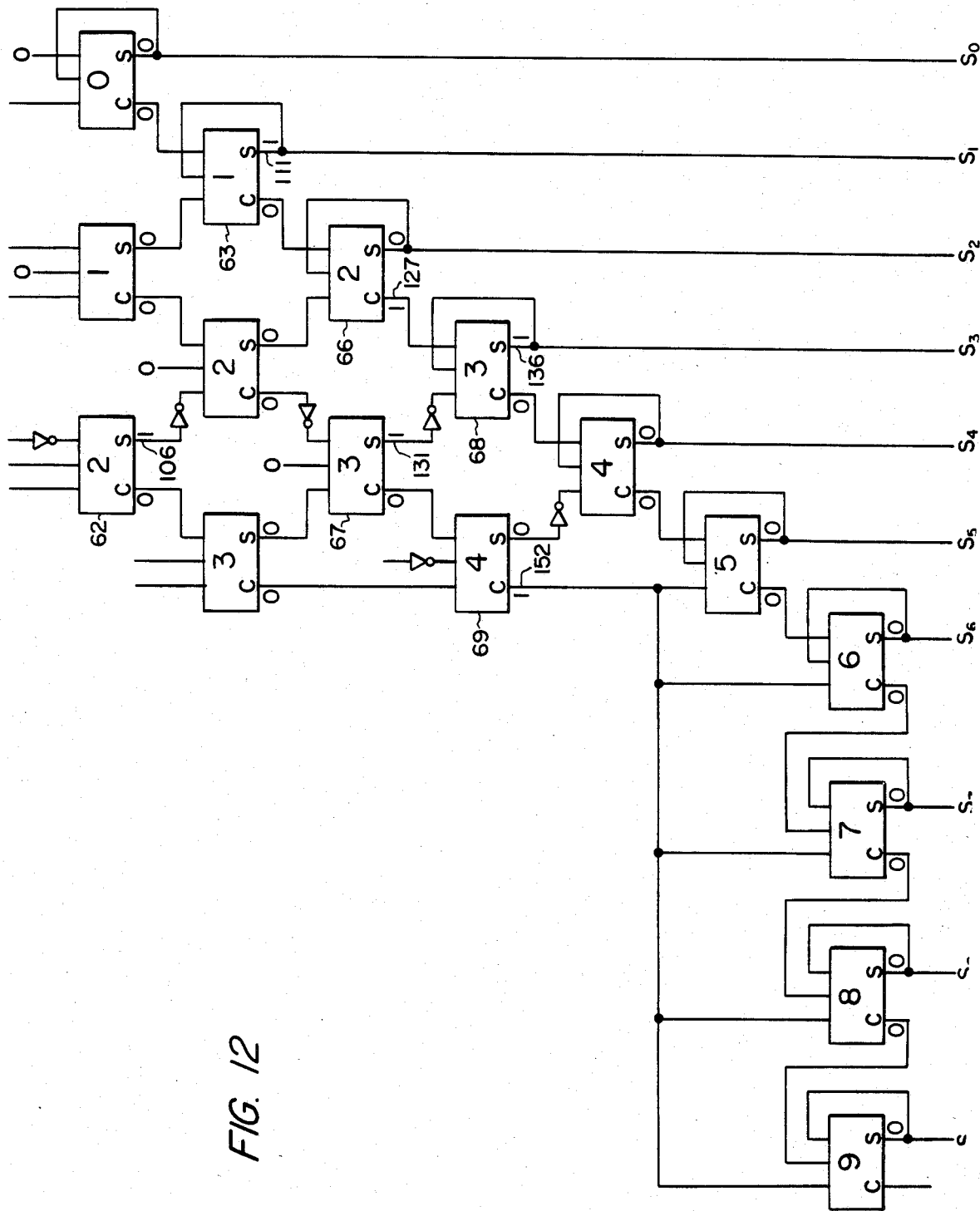

FIG. 12 indicates the output signal values at the end of the fourth clock period. As shown in FIG. 12 the output signals at output regions 106 of cell 62, 111 of cell 63, 127 of cell 66, 131 of cell 67, 136 of cell 68, and 152 of cell 69 are all indicative of values equal to 1. All other output signals are indicative of values equal to 0 at the end of the fourth clock period.

Figure 13:
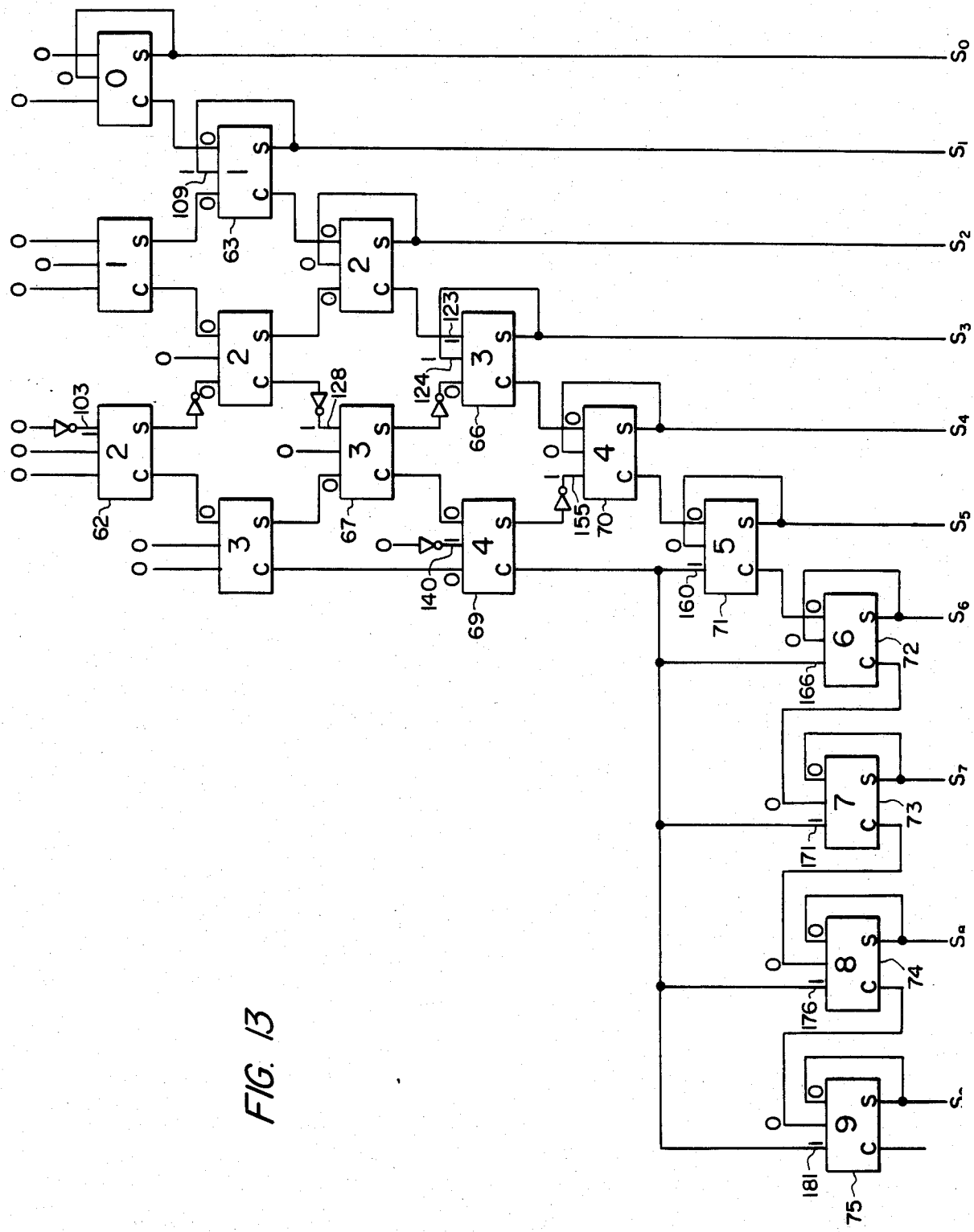

FIG. 13 illustrates the input signals to the cells of the arrays at the beginning of the fifth clock period. The input signals which are indicative of the values equal to 1 are those to input regions 103 of cell 62, input region 109 of cell 63, input region 128 of cell 67, input regions 133 and 134 of cell 68, input region 140 of cell 69, input region 160 of cell 71, input region 166 of cell 72, input region 171 of cell 73, input region 176 of cell 74, and input region 181 of cell 75. All other input regions receive input signals indicative of values equal to 0 at the beginning of the fifth clock period.

Figure 14:
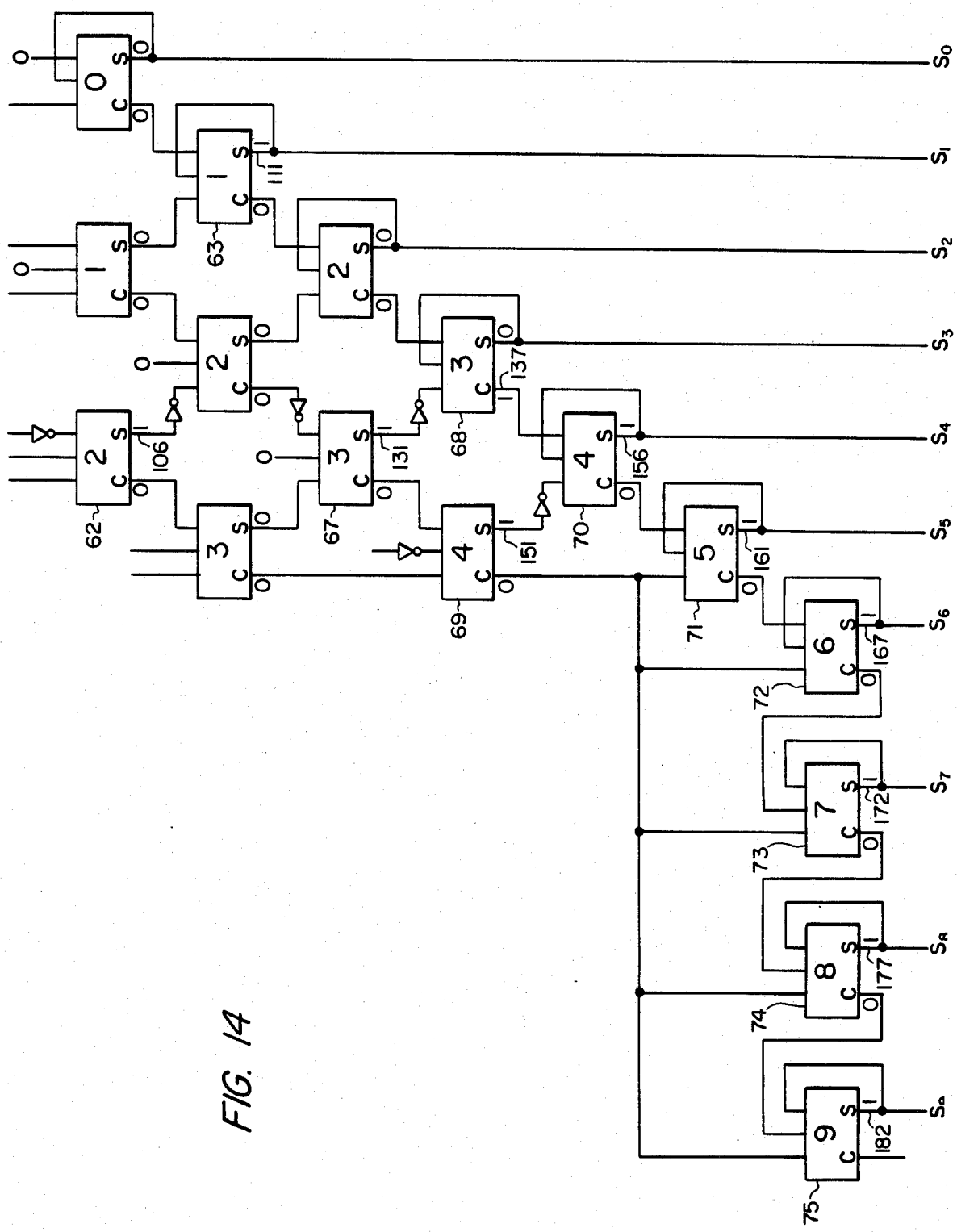

FIG. 14 illustrates the output signals from the cells of the array at the end of the fifth clock period. At that time the output regions which will receive a signal indicative of a value of 1 are output region 106 of cell 62, output region 111 of cell 63, output region 131 of cell 67, output region 137 of cell 68, output region 151 of cell 61, output region 156 of cell 70, output region 161 of cell 71, output region 167 of cell 72, output region 172 of cell 73, output region 177 of cell 74, and output region 182 of cell 75. All other output regions receive signals indicative of values of 0 at the end of the fifth clock period.

Figure 15:
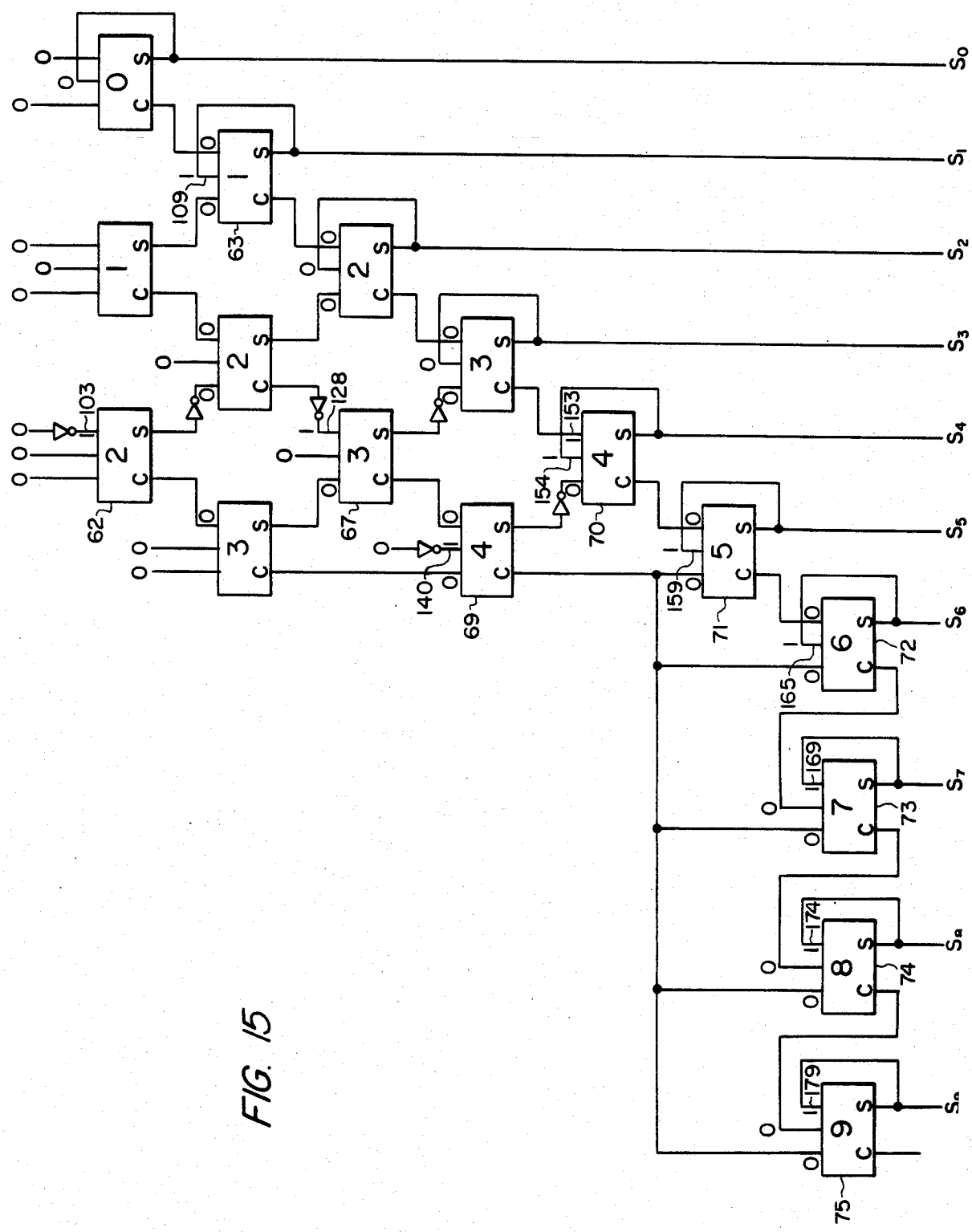

FIG. 15 illustrates the input signals to the input regions of the cells of the array at the beginning of the sixth clock period. The input regions receiving input signals indicative of values equal to 1 are input region 103 of cell 62, input region 109 of cell 63, input region 128 of cell 67, input region 140 of cell 69, input regions 153 and 154 of cell 70, input region 159 of cell 71, input region 165 of cell 72, input region 169 of cell 73, input region 174 of cell 74, and input region 181 of cell 75. All other input regions of the cells of the array receive signals indicative of values equal to 0 at the beginning of the sixth clock period.

Figure 16:
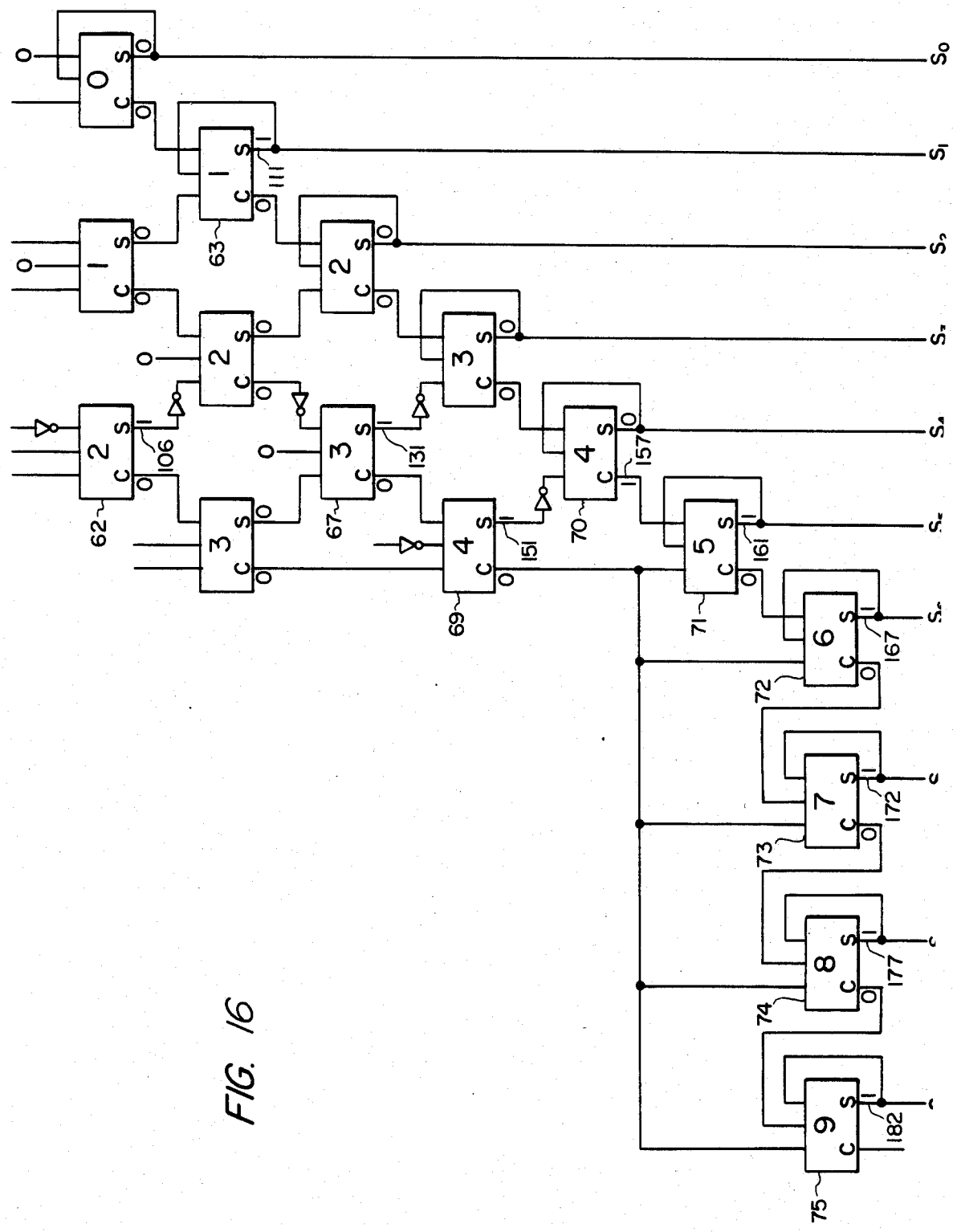

FIG. 16 illustrates the output signals arriving at the output regions of the cells of the array at the end of the sixth clock period. Those output regions receiving a signal indicative of a value of 1 are output region 106 of cell 62, output region 111 of cell 63, output region 131 of cell 67, output region 151 of cell 69, output region 157 of cell 70, output region 161 of cell 71, output region 167 of cell 72, output region 172 of cell 73, output region 177 of cell 74, and output region 182 of cell 75. All other output regions of the cells of the array receive a signal indicative of a value of 0 at the end of the sixth clock period.

Figure 17:
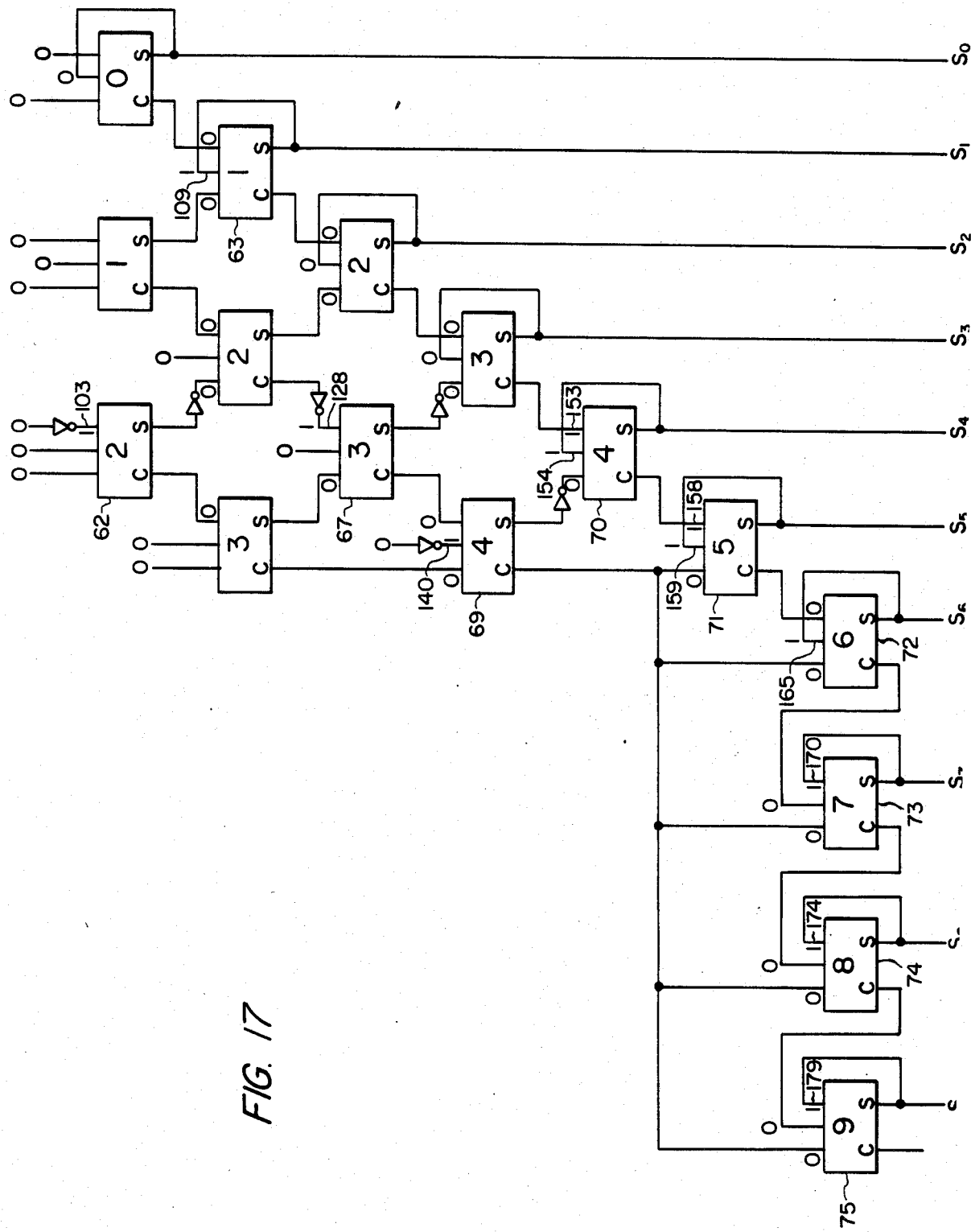

FIG. 17 illustrates the input signals to the input regions of the cells of the array at the beginning of the seventh clock period. The input regions receiving input signals indicative of a value of 1 at the beginning of the seventh clock period are input region 103 of cell 62, input region 109 of cell 63, input region 128 of cell 67, input region 140 of cell 69, input regions 158 and 159 of cell 71, input region 165 of cell 72, input region 169 of cell 73, input region 174 of cell 74, and input region 179 of cell 75. All other input regions of the cells of the array receive signals indicative of values equal to 0 at the beginning of the seventh clock period.

Figure 18:
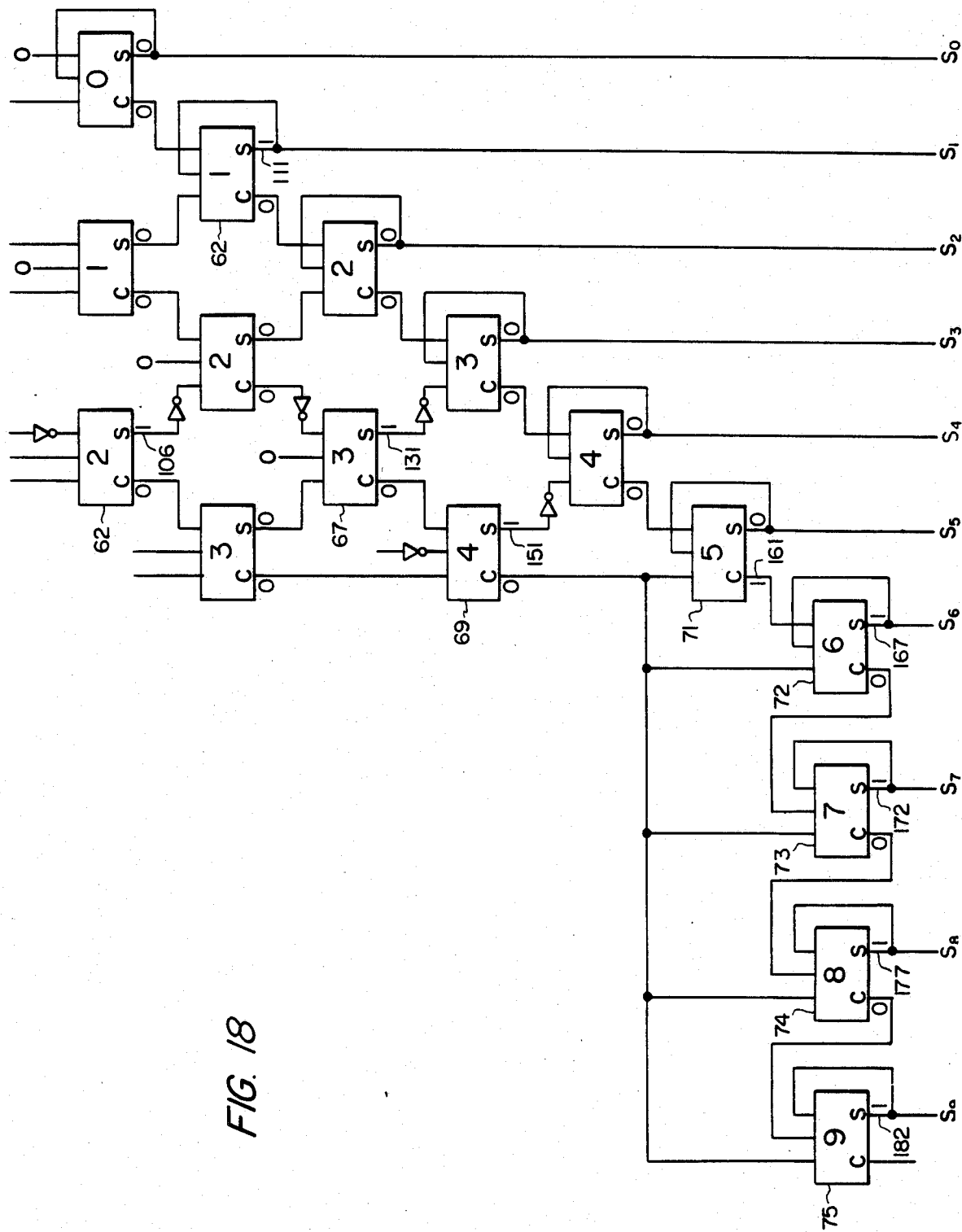

FIG. 18 illustrates the output signals received by each of the output regions of the cells of the array at the end of the seventh clock period. Those output regions receiving signals indicative of values equal to 1 are output region 106 of cell 62, output region 111 of cell 63, output region 131 of cell 67, output region 151 of cell 69, output region 162 of cell 72, output region 167 of cell 72, output region 172 of cell 73, output region 177 of cell 74, and output region 182 of cell 75. All other output regions of the cells of the array receive signals indicative of values equal to 0 at the end of the seventh clock period.

Those skilled in the art will readily perceive that during the subsequent clock periods the output signals at output regions 167, 172, 177, and 182 of cells 72, 73, 74, and 75, respectively, will take on values indicative of 0. Therefore, at the end of the eleventh clock period array output regions 82 and 84–91 will all receive signals indicative of values equal to 0, while array output region 83 will receive a signal indicative of a value of 1. The total output signal from the array therefore, corresponds to a value of $10_2$, which is equal to the decimal number 2. This corresponds to the correct answer in the example posed.

Figure 19:
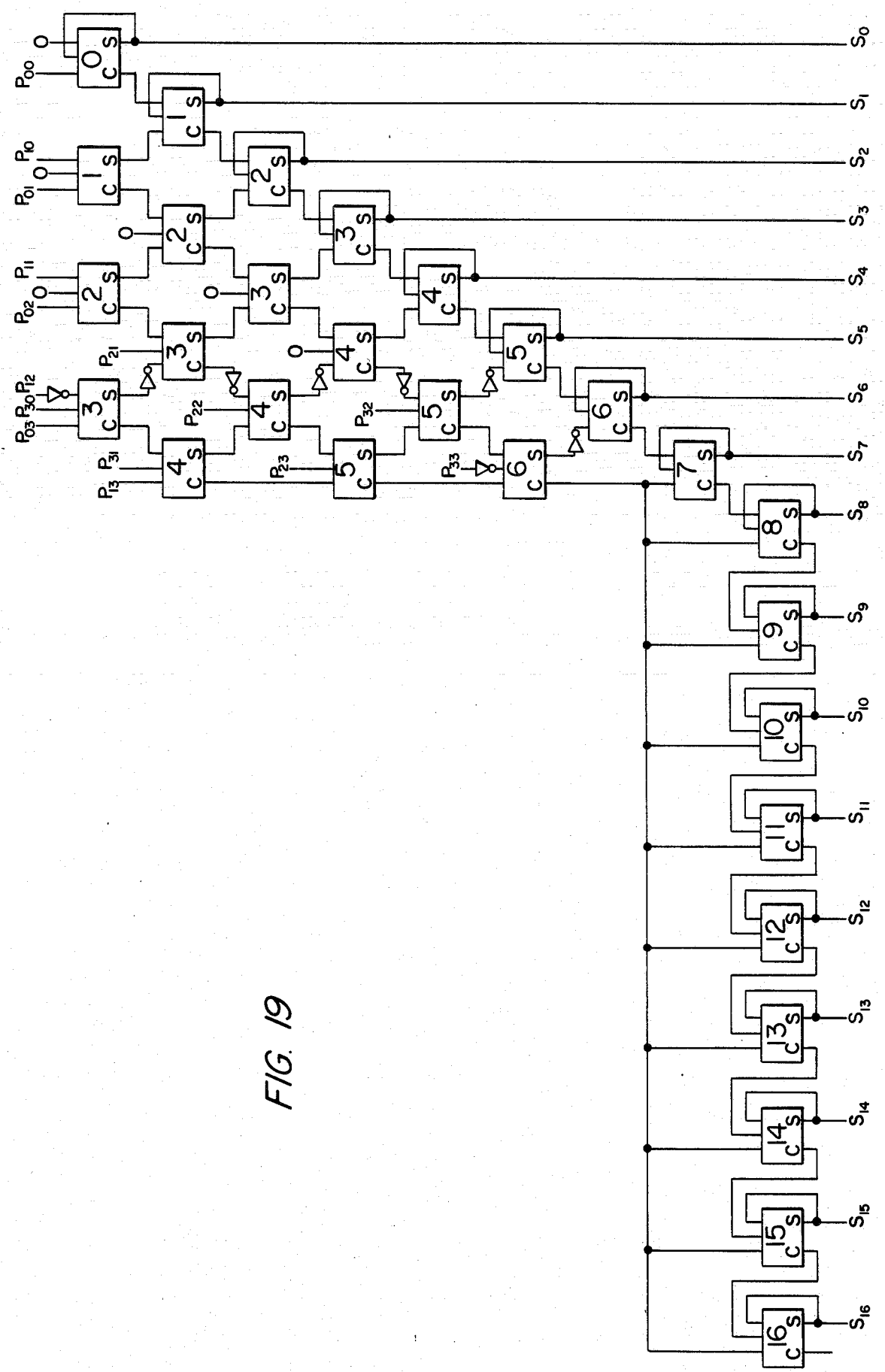
FIG. 19 is a block diagram of the invention configured for use with four bit input signals.

As mentioned above the invention is not limited to 3 bit input signals, and in fact would typically be used in conjunction with input signals having a greater number of bits. FIG. 19 illustrates a system for processing 4 bit binary numbers. The system of FIG. 19 utilizes 29 of the basic cells as shown in FIGS. 1 and 2 to produce a 17 bit output signal from 4 bit input signals. Those skilled in the art will perceive that the operation of the system of FIG. 1 is entirely analogous to that of the system of FIG. 4 and the operation of the circuit of FIG. 19 will not be described in greater detail.

The embodiments of the invention in which an exclusive property or right is claimed are defined as follows:

1. Apparatus for calculating a sum of products of pairs of input numbers, each of said pairs of input numbers including a first member presented as an m bit binary number and a second member presented as an n bit binary number, said apparatus providing a k bit binary number as an output signal at k apparatus output means, where n, m, and k are positive integers, said system comprising: clock conductor line means, a plurality of basic cell means each of said basic cell means having a clock input terminal means, a plurality of signal input terminal means, and q output terminal means, where q is an integer, said clock input terminal means being electrically connected to said clock conductor line means each of said basic cell means being capable of performing an adder operation on signals arriving at said signal input terminal means and further being capable of latching results from said adder operation at said output terminal means upon receipt of a predetermined signal at said clock input terminal means, each of said basic cell means having a cell bit weight associated therewith, said cell bit weights being integers in the range of zero to $k-1$, each of said basic cell signal input terminal means having a device bit weight and array bit weight associated therewith, said array bit weight being equal to said device bit weight plus the cell bit weight of a basic cell means of which said basic cell signal input terminal means is a portion, each of said basic cell means output terminal means having a device bit weight and an array bit weight, said array bit weight being equal to said device bit weight plus the cell bit weight of a basic cell means of which said basic cell means output terminal means is a portion, k of said basic cell means being designated output cells, each of said output cells having a cell bit weight associated therewith which differs from cell bit weights associated with all other output cells, the remainder of said basic cell means being designated nonoutput cells, one of said output cells having a cell bit weight equal to $k-1$ and being designated a highest order output cell, each of said output cells having at least one basic cell means output terminal means having a device bit weight equal to zero and at least one basic cell input signal terminal means having a device bit weight equal to zero, said output terminal means having a device bit weight equal to zero serving as one of said apparatus output means and being electrically connected to said signal input terminal means having a device bit weight equal to zero, and all remaining output terminal means of each of said output cells except said highest order output cell, being electrically connected to one of said signal input means of an output cell, said signal input terminal means to which said remaining output terminal means is connected having an array bit weight equal to said array bit weight of said remaining output terminal means, and each of said output terminal means of said nonoutput cells being electrically connected to one of said signal input terminal means of a basic cell means, said signal input terminal means having an array bit weight equal to said array bit weight of said output terminal means to which said signal input terminal means is connected.

2. The apparatus of claim 1 further comprising n times m logical AND gates, each of said logical AND gates having first and second input regions and an output region, each of said logical AND gate first input regions being adapted to accept as an input signal a value of a selected bit of one member of each of said pairs of input numbers and each of said logical AND gate second input regions being adapted to accept as an input signal a value of a selected bit of the remaining member of each pair of input numbers, and each of said logical AND gate output regions is electrically connected to one of said basic cell signal input terminal means.

3. The apparatus of claim 2 wherein q is equal to two.
4. The apparatus of claim 3 wherein n is equal to m.
5. The apparatus of claim 2 wherein n is equal to m.

* * * * *